United States Patent
Paladugu et al.

(10) Patent No.: US 10,412,618 B2
(45) Date of Patent: Sep. 10, 2019

(54) OPTIMISTIC QUALITY OF SERVICE SET UP

(71) Applicant: QUALCOMM Incorporated, San Diego, CA (US)

(72) Inventors: Karthika Paladugu, San Diego, CA (US); Kirankumar Anchan, San Diego, CA (US); Arvind V. Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 14/012,985

(22) Filed: Aug. 28, 2013

(65) Prior Publication Data

US 2014/0064070 A1    Mar. 6, 2014

Related U.S. Application Data

(60) Provisional application No. 61/695,734, filed on Aug. 31, 2012.

(51) Int. Cl.
*H04W 28/02* (2009.01)
*H04W 76/12* (2018.01)
(Continued)

(52) U.S. Cl.
CPC ..... *H04W 28/0268* (2013.01); *H04L 47/2475* (2013.01); *H04W 28/24* (2013.01); *H04W 76/12* (2018.02)

(58) Field of Classification Search
CPC .......... H04L 47/2475; H04W 28/0268; H04W 28/24; H04W 76/12; H04W 76/022
(Continued)

(56) References Cited

U.S. PATENT DOCUMENTS

| 7,609,673 B2 | 10/2009 | Bergenlid et al. |
| 7,797,008 B2 | 9/2010 | Crisler et al. |

(Continued)

FOREIGN PATENT DOCUMENTS

| CN | 1756232 A | 4/2006 |
| CN | 1859306 A | 11/2006 |

(Continued)

OTHER PUBLICATIONS

International Search Report and Written Opinion—PCT/US2013/057412—ISA/EPO—dated Feb. 11, 2014 (123984WO).

*Primary Examiner* — Christopher P Grey
(74) *Attorney, Agent, or Firm* — Muncy, Geissler, Olds & Lowe

(57) ABSTRACT

The disclosure relates to optimistic QoS setup. A network element receives an IP packet that is not associated with a QoS request on a bearer for an application/service executing on a target client device, and initiates QoS activation for the target client device based on a combination of an application-specific identifier from the target client device and a user-specific identifier of the application/service. A server receives a session setup request that is not associated with a QoS request for an application/service executing on a target client device, the session setup request identifying one or more client devices to participate in a session, and initiates QoS activation for at least one of the client devices, before a session announcement is transmitted to the client devices, based on a combination of an application-specific identifier from the target client device and a user-specific identifier of the application/service.

53 Claims, 14 Drawing Sheets

(51) Int. Cl.
*H04L 12/859* (2013.01)
*H04W 28/24* (2009.01)

(58) Field of Classification Search
USPC .......................................................... 370/230
See application file for complete search history.

(56) References Cited

U.S. PATENT DOCUMENTS

| | | | |
|---|---|---|---|
| 7,907,541 B2 | 3/2011 | Lindstroem et al. | |
| 8,422,448 B2 | 4/2013 | Chu et al. | |
| 8,612,612 B1* | 12/2013 | Dukes et al. | 709/228 |
| 9,007,899 B2* | 4/2015 | Kotecha et al. | 370/230 |
| 2005/0048983 A1 | 3/2005 | Abraham et al. | |
| 2007/0223491 A1 | 9/2007 | Baek et al. | |
| 2008/0192753 A1 | 8/2008 | Li | |
| 2008/0310303 A1 | 12/2008 | Wang et al. | |
| 2010/0248691 A1* | 9/2010 | Lindner | H04L 63/102 455/411 |
| 2011/0194433 A1 | 8/2011 | Song et al. | |
| 2011/0211439 A1* | 9/2011 | Manpuria | H04W 76/18 370/216 |
| 2011/0292798 A1* | 12/2011 | Manpuria | H04W 28/26 370/231 |
| 2012/0155282 A1 | 6/2012 | Dorenbosch | |
| 2012/0295617 A1* | 11/2012 | Anchan | H04W 76/45 455/435.1 |
| 2013/0007287 A1 | 1/2013 | Chu et al. | |
| 2013/0091526 A1 | 4/2013 | Iyer et al. | |

FOREIGN PATENT DOCUMENTS

| | | |
|---|---|---|
| KR | 20090020096 A | 2/2009 |
| WO | 2004066659 A1 | 8/2004 |
| WO | 2007139841 A2 | 12/2007 |
| WO | 2011150191 A1 | 12/2011 |

\* cited by examiner

OPTIMISTIC QUALITY OF SERVICE SET UP

CLAIM OF PRIORITY UNDER 35 U.S.C. § 119

The present application for patent claims priority to Provisional Application No. 61/695,734, entitled "OPTIMISTIC QUALITY OF SERVICE SET UP," filed Aug. 31, 2012, and assigned to the assignee hereof and hereby expressly incorporated by reference herein.

BACKGROUND OF THE INVENTION

1. Field of the Invention

Embodiments of the invention relate to optimistic activation of quality of service for a high priority guaranteed bit rate application on LTE

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

SUMMARY

The disclosure relates to optimistic quality of service (QoS) setup. A method for optimistic QoS setup performed by a network element includes receiving an Internet protocol (IP) packet that is not associated with a QoS request on a bearer for an application or service executing on a target client device, and in response to receiving the IP packet, initiating QoS activation for the target client device based on a combination of an application-specific identifier from the target client device and a user-specific identifier of the application or service.

A method for optimistic QoS setup performed by an application server includes receiving a session setup request that is not associated with a QoS request for an application or service executing on a target client device, the session setup request identifying one or more client devices to participate in a session, and in response to receiving the session setup request, initiating QoS activation for at least one of the one or more client devices, before a session announcement is transmitted to the one or more client devices, based on a combination of an application-specific identifier from the target client device and a user-specific identifier of the application or service.

An apparatus for optimistic QoS setup includes logic configured to receive an IP packet that is not associated with a QoS request on a bearer for an application or service executing on a target client device, and logic configured to initiate QoS activation for the target client device based on a combination of an application-specific identifier from the target client device and a user-specific identifier of the application or service in response to receiving the IP packet.

An apparatus for optimistic QoS setup includes logic configured to receive a session setup request that is not associated with a QoS request for an application or service executing on a target client device, the session setup request identifying one or more client devices to participate in a session, and logic configured to initiate, in response to receiving the session setup request, QoS activation for at least one of the one or more client devices, before a session announcement is transmitted to the one or more client devices, based on a combination of an application-specific identifier from the target client device and a user-specific identifier of the application or service.

An apparatus for optimistic QoS setup includes means for receiving an IP packet that is not associated with a QoS request on a bearer for an application or service executing on a target client device, and means for initiating, in response to receiving the IP packet, QoS activation for the target client device based on a combination of an application-specific identifier from the target client device and a user-specific identifier of the application or service.

An apparatus for optimistic QoS setup includes means for receiving a session setup request that is not associated with a QoS request for an application or service executing on a target client device, the session setup request identifying one or more client devices to participate in a session, and means for initiating, in response to receiving the session setup request, QoS activation for at least one of the one or more client devices, before a session announcement is transmitted to the one or more client devices, based on a combination of an application-specific identifier from the target client device and a user-specific identifier of the application or service.

A non-transitory computer-readable medium for optimistic QoS setup includes at least one instruction to receive an IP packet that is not associated with a QoS request on a bearer for an application or service executing on a target client device, and at least one instruction to initiate QoS activation for the target client device based on a combination of an application-specific identifier from the target client device and a user-specific identifier of the application or service in response to receiving the IP packet.

A non-transitory computer-readable medium for optimistic QoS setup includes at least one instruction to receive a session setup request that is not associated with a QoS request for an application or service executing on a target client device, the session setup request identifying one or more client devices to participate in a session, and at least one instruction to initiate, in response to receiving the session setup request, QoS activation for at least one of the one or more client devices, before a session announcement is transmitted to the one or more client devices, based on a combination of an application-specific identifier from the target client device and a user-specific identifier of the application or service.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
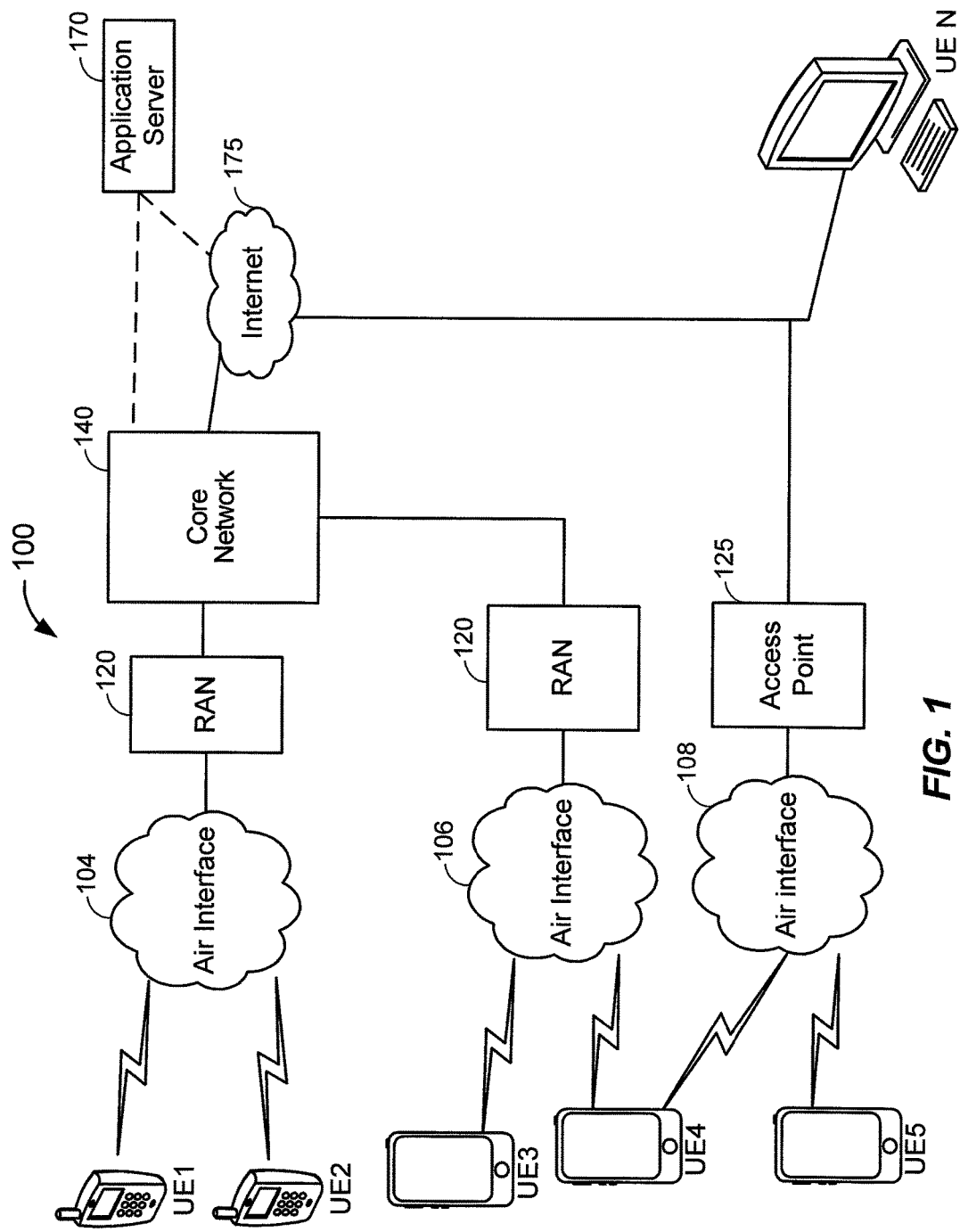
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
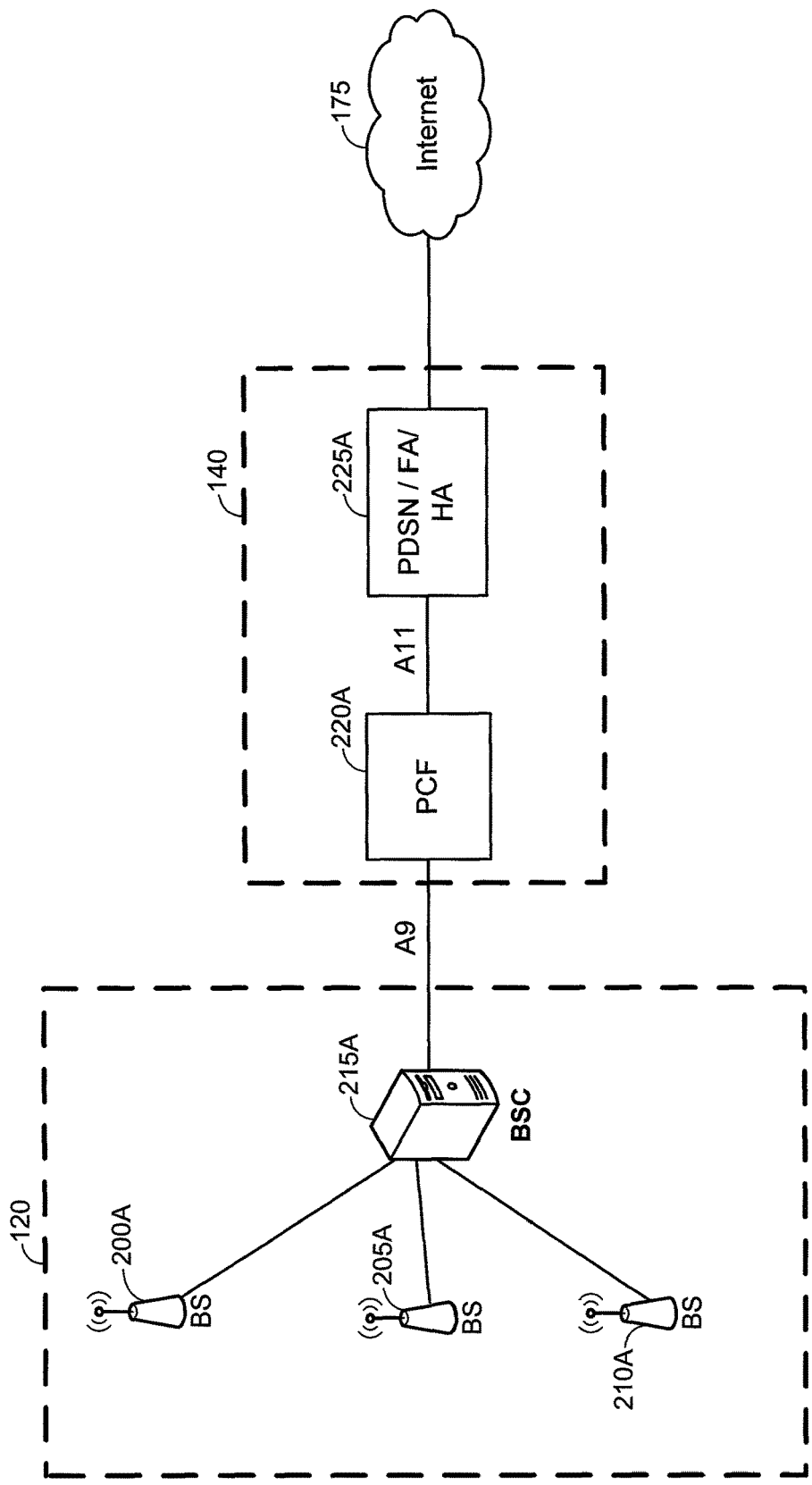
FIG. 2A illustrates an example configuration of a radio access network (RAN) and a packet-switched portion of a core network for a 1x EV-DO network in accordance with an embodiment of the invention.

FIG. 2A illustrates an example configuration of the RAN 120 and the core network 140 for packet-switched communications in a CDMA2000 1x Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
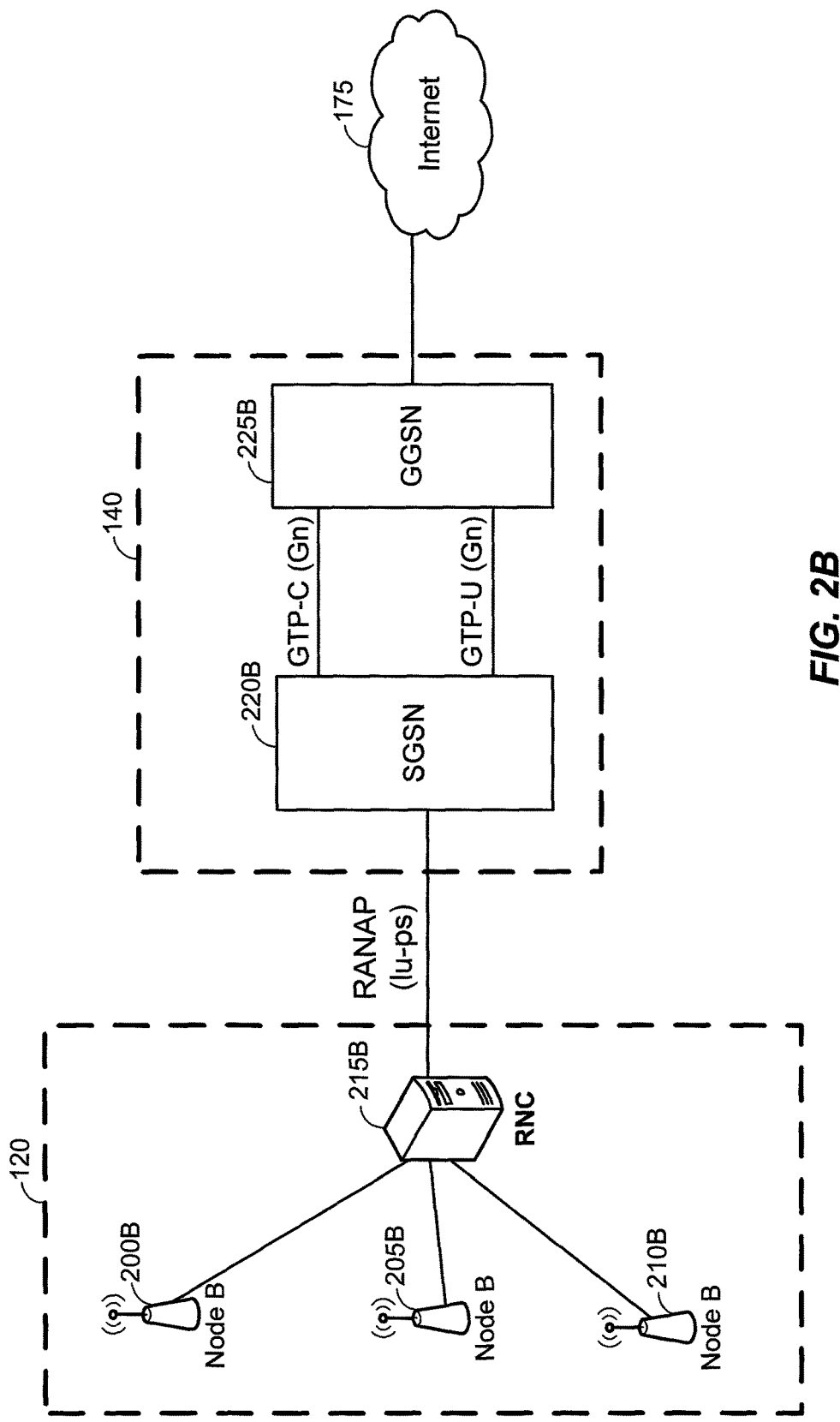
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1x EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., International Mobile Subscriber Identity (IMSI), PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
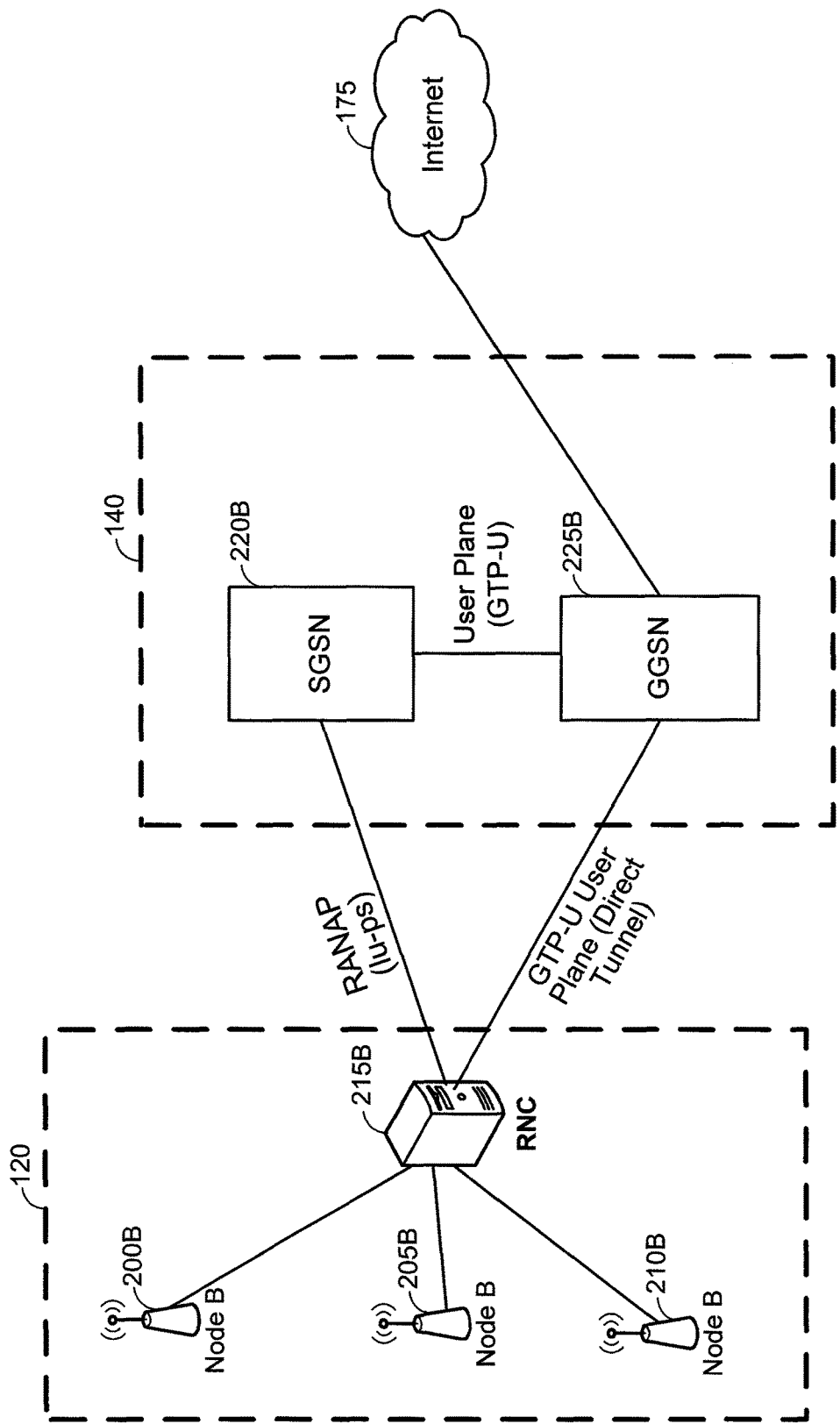
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel When the RAB assigned for a PDP context is released (i.e. the PDP context is preserved) the GTP-U tunnel is established between the GGSN 225B and SGSN 220B in order to be able to handle the downlink packets.

Figure 2D:
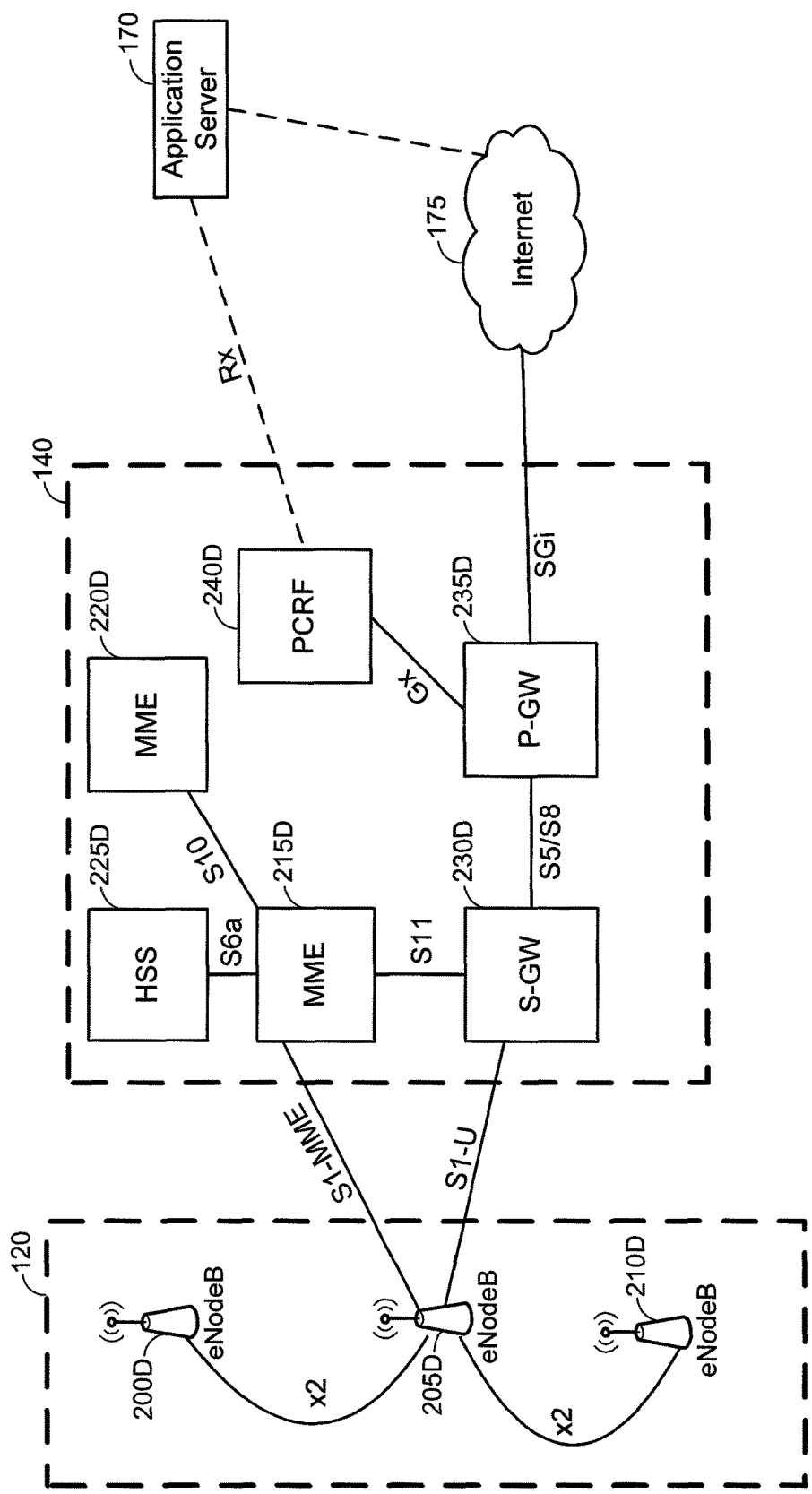
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
|---|---|
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
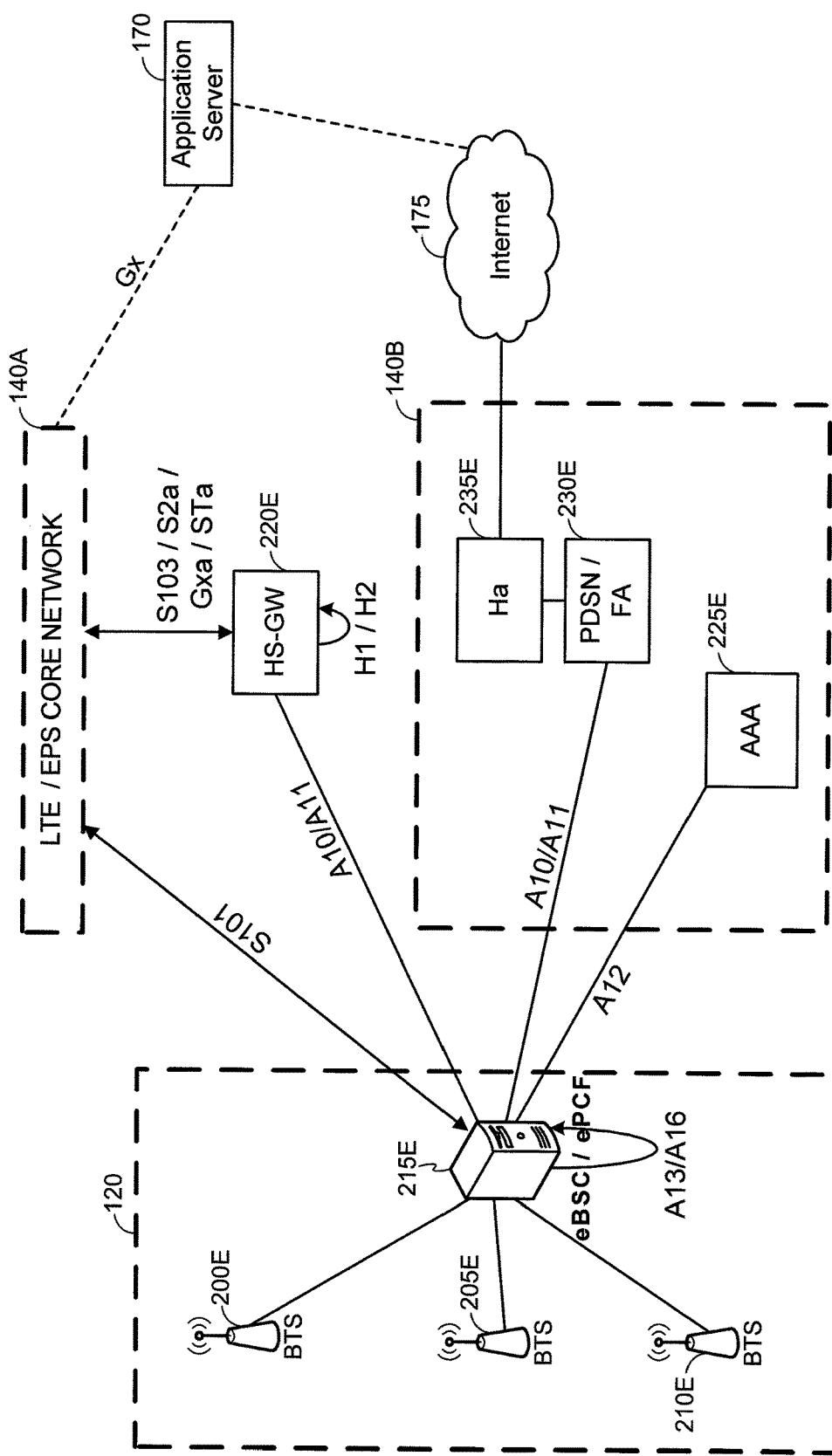
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 230D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
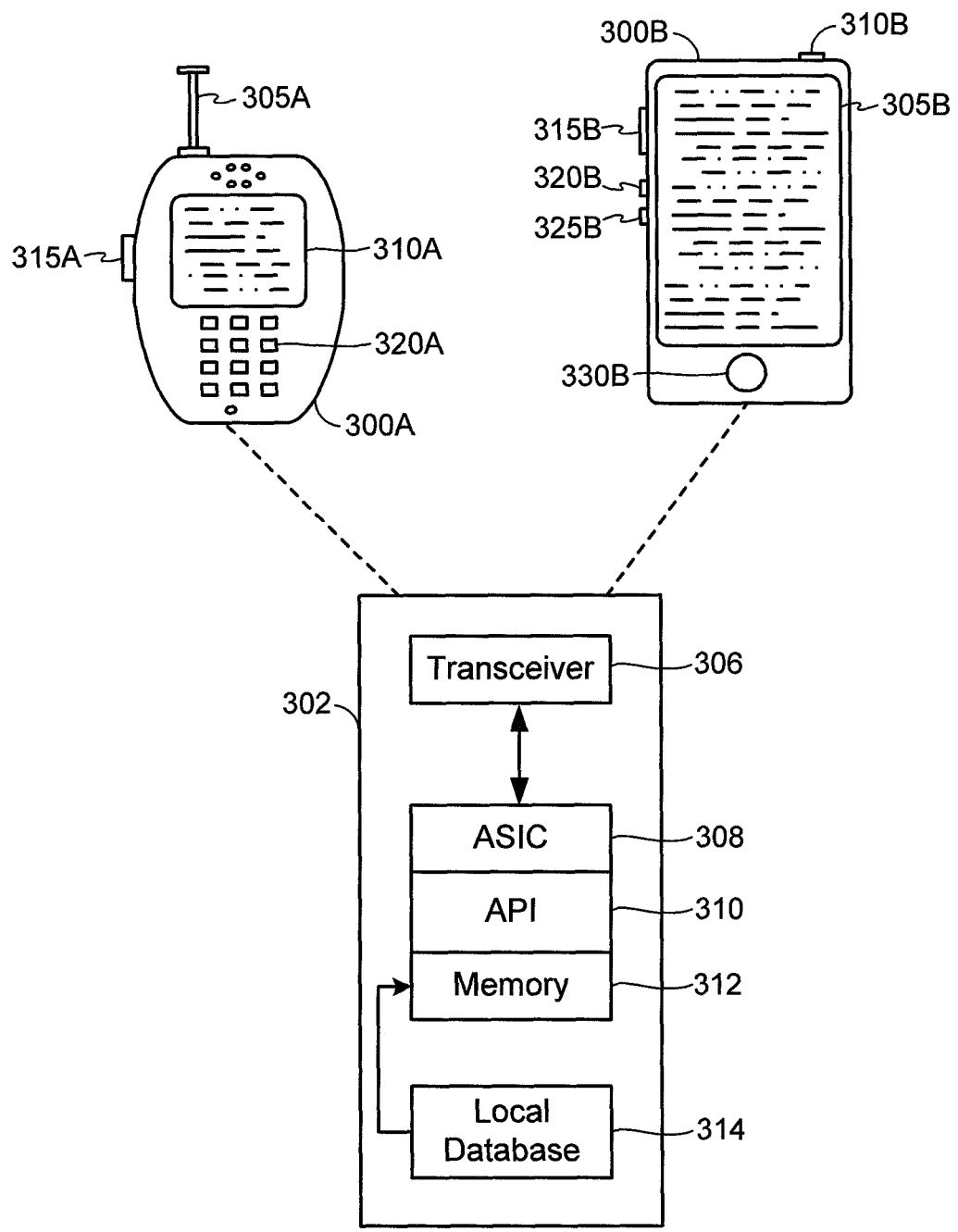
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
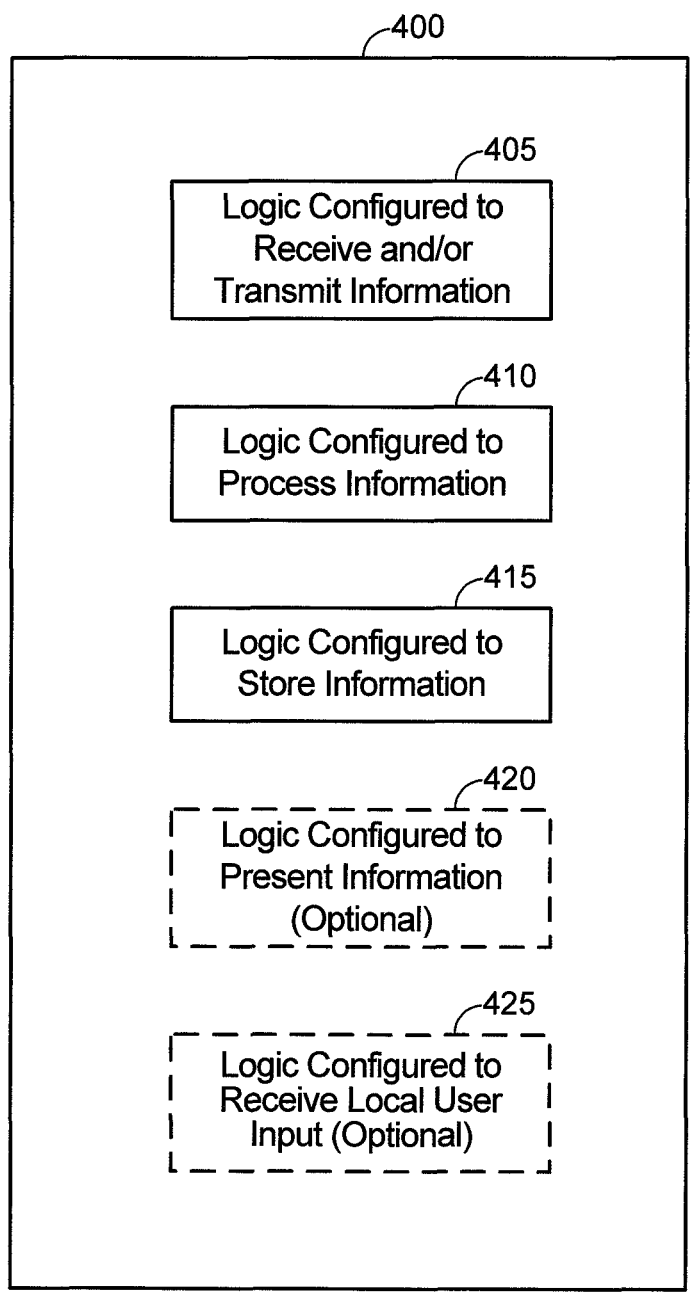
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application server 170, etc.), the logic configured to receive and/or transmit information 405 can correspond to an Ethernet card, in an example, that connects the network-based server to other communication entities via an Ethernet protocol. In an example, the logic configured to receive and/or transmit information 405 can include logic configured to receive an IP packet that is not associated with a QoS request on a bearer for an application or service executing on a target client device, and logic configured to initiate QoS activation for the target client device based on a combination of an application-specific identifier from the target client device and a user-specific identifier of the application or service in response to receiving the IP packet. In another example, the logic configured to receive and/or transmit information 405 can include logic configured to receive a session setup request that is not associated with a QoS request for an application or service executing on a target client device, the session setup request identifying one or more client devices to participate in a session, and logic configured to initiate, in response to receiving the session setup request, QoS activation for at least one of the one or more client devices, before a session announcement is transmitted to the one or more client devices, based on a combination of an application-specific identifier from the target client device and a user-specific identifier of the application or service. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

LTE supports both UE-initiated and network-initiated QoS. In a UE-initiated QoS scenario, an application resident on the UE requests the setup of an additional dedicated bearer with a specific QCI for a particular PDN connection. In a network-initiated QoS scenario, the network initiates the setup of an additional dedicated bearer with specific QCI for a particular PDN connection. The trigger for the network-initiated dedicated bearer setup could come from the application server, such as application server 170 in FIG. 2D, or from the PCRF, such as PCRF 240D, or the P-GW, such as P-GW 235D, based on pre-configured subscriber QoS information retrieved from the HSS, such as HSS 225D, and on the detection of a PDN connectivity request for a specific access point name (APN). Conventionally, LTE networks support the network-initiated QoS (either the application server-initiated dedicated bearer setup or the PCRF/P-GW-initiated dedicated bearer setup).

In LTE, the core network, such as core network 140 in FIG. 2D, maintains the S5 connection between the S-GW 230D and the P-GW 235D for the default EPS bearers corresponding to each PDN connection in an "always on" state. That is, the core network 140 does not release these connections in the IDLE state. As the default EPS bearers can only be configured with a non-GBR QoS, maintaining the default EPS bearer connections in an active state does not impact the capacity of the core network 140.

Typically, to conserve resources, the core network 140 releases the S5 connections for GBR EPS bearers when transitioning to the IDLE state. No GBR EPS bearer context is maintained in the IDLE state. Voice over LTE (VoLTE), for example, is based on this design. Specifically, the application server 170 can setup GBR media bearers on demand during a VoLTE call setup.

A high priority GBR application, denoted as App*, is any application that requires GBR QoS on an associated EPS media bearer for supporting its communication sessions (e.g., PTT sessions, VoIP sessions, etc.) and that uses a dedicated APN, where the dedicated APN is configured to specifically identify the App* to external devices, such as components of the LTE core network 140.

App* media traffic requires a GBR QoS bearer in LTE/WCDMA networks to reduce congestion related packet losses. An App* requires the GBR QoS bearer logical connections (S5 in LTE) to be kept "always on," but permits the air interface resources to be released while in an idle state (Radio Resource Control (RRC) IDLE in LTE). Keeping the GBR QoS bearers always on reduces the QoS bearer setup delays during a call setup and reduces the period for which media traffic is sent on the non-GBR flow (best effort or QoS) during a call. The App* call setup delays are smaller compared to VoLTE, for example, and thus having to setup a media bearer within the short duration of the call setup may not be feasible.

When the network cannot support the necessary always on App* GBR S5 connection in the idle state or releases the App* GBR S5 connection due to resource constraints, or other reasons, the App* media traffic is transmitted over a non-GBR bearer until the GBR bearer is setup. The problem is that this impacts the App* media performance. As such, a faster setup of the App* GBR EPS bearer for the App* call is desirable.

Accordingly, the various aspects of the disclosure provide for optimistic on demand activation of the App* GBR EPS bearer by the application server 170 or core network 140 to reduce the bearer setup delays. The various aspects are "optimistic" in that, instead of waiting for the call to be setup, the QoS can be setup as soon as the App* call initiation is detected. Further, to conserve resources, the GBR EPS bearer activation can selectively be performed for App* calls and not for calls that would not benefit from QoS, such as text messages and/or alerts that are not transmitted with audio and/or video. The various aspects are applicable for any other services (e.g., VoLTE) or other applications that require a GBR EPS bearer for application media traffic.

Figure 5:
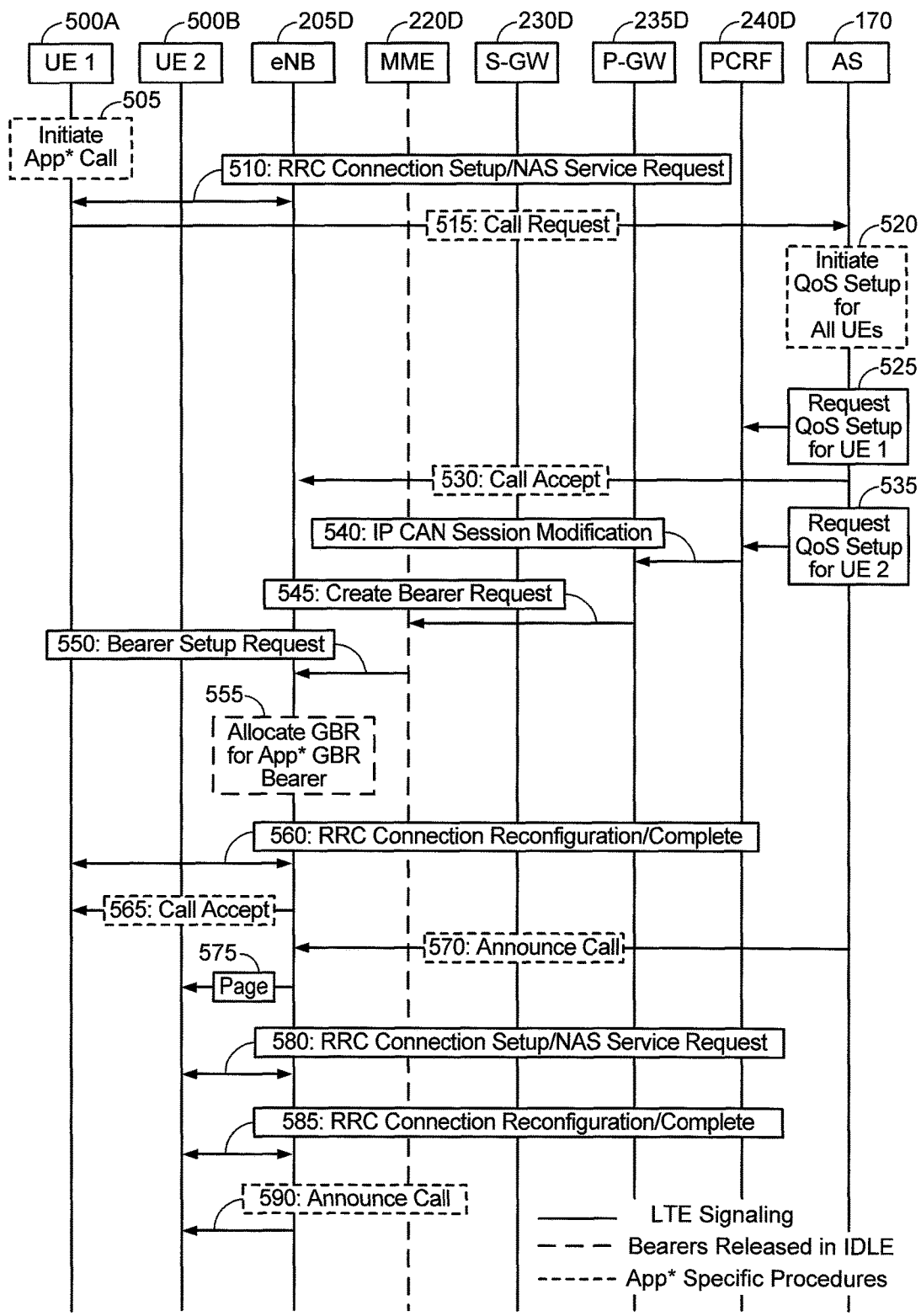
FIG. 5 illustrates an exemplary flow of a QoS allocation initiated by an application server, according to an embodiment.

FIG. 5 illustrates an exemplary flow of a QoS allocation initiated by an application server, such as application server 170. Initially, there are no active App* GBR EPS bearers. Rather, the only active bearers are the App*'s default non-GBR bearers.

At 505, UE 1 500A initiates an App* call to UE 2 500B. At 510, UE 1 500A and an eNB, such as eNB 205D, exchange RRC connection setup and NAS service request messages. At 515, UE 1 500A sends a call request message to the application server 170.

At 520, on receiving the call request from UE 1 500A, the application server 170 optimistically initiates the QoS setup for all UEs in the call (here, UE 1 500A and UE 2 500B) without waiting for the call acceptances from the target(s). At 525, the application server 170 transmits a message to the PCRF 240D requesting QoS setup for UE 1 500A. The application server 170 may use the Rx interface, for example, or a proprietary interface. The application server 170 can use an application-specific identifier received from the UE 1 500A in the call request to activate QoS only for certain users of the App* and not others. The application-specific identifier may be one of or a combination of an APN, a QCI, a differentiated services code point (DSCP), or an IP address. Alternatively, or additionally, the IMSI and an IP address/port may identify a specific user-service combination. These identifiers can be used to determine whether the particular user of the application is allowed to get QoS for the service or not. In this way, the application server 170 does not need to know the QCI.

At 530, the application server 170 sends a call acceptance message to the eNB 205D. At 535, the application server 170 transmits a message to the PCRF 240D requesting QoS setup for UE 2 500B. The application server 170 may use the Rx interface or a proprietary interface.

At 540, upon receiving the requests for QoS setup, the PCRF 240D sends a message to the P-GW 235D modifying the IP-CAN session. At 545, the P-GW 235D creates a bearer request and sends it to the MME 220D. The request indicates the EPS bearer QoS for UE 1 500A and UE 2 500B and includes the values (QCI—"$QCI_{App}$*" or "1," GBR UL/DL—"$X_{App}$*" kbps). At 550, the MME 220D sends the bearer setup request to the eNB 205D. The request indicates the dedicated EPS bearer QoS for UE 1 500A and UE 2 500B and also includes the values (QCI—"$QCI_{App}$*" or "1," GBR UL/DL—"$X_{App}$*" kbps).

At 555, the eNB 205D in the RAN 120 of FIG. 5 allocates the GBR for the App* GBR bearer as per the QoS received from the MME 220D for UE 1 500A and UE 2500B. Like the other bearers established by the MME 220D, these bearers will be released when a UE is moved to the RRC_IDLE state.

At 560, UE 1 500A and the eNB 205D exchange RRC connection reconfiguration and RRC connection reconfiguration complete messages. At 565, the eNB 205D sends the UE 1 500A a call accept message.

At 570, the application server 170 sends a call announce message to the eNB 205D. At 575, the eNB 205D pages UE 2 500B. At 580, the eNB 205D and UE 2 500B exchange RRC connection setup and NAS service request messages. At 585, the eNB 205D and UE 2 500B exchange RRC connection reconfiguration and RRC connection reconfiguration complete messages. At 590, the eNB 205D sends a call announcement message to UE 2 500B.

Figure 6:
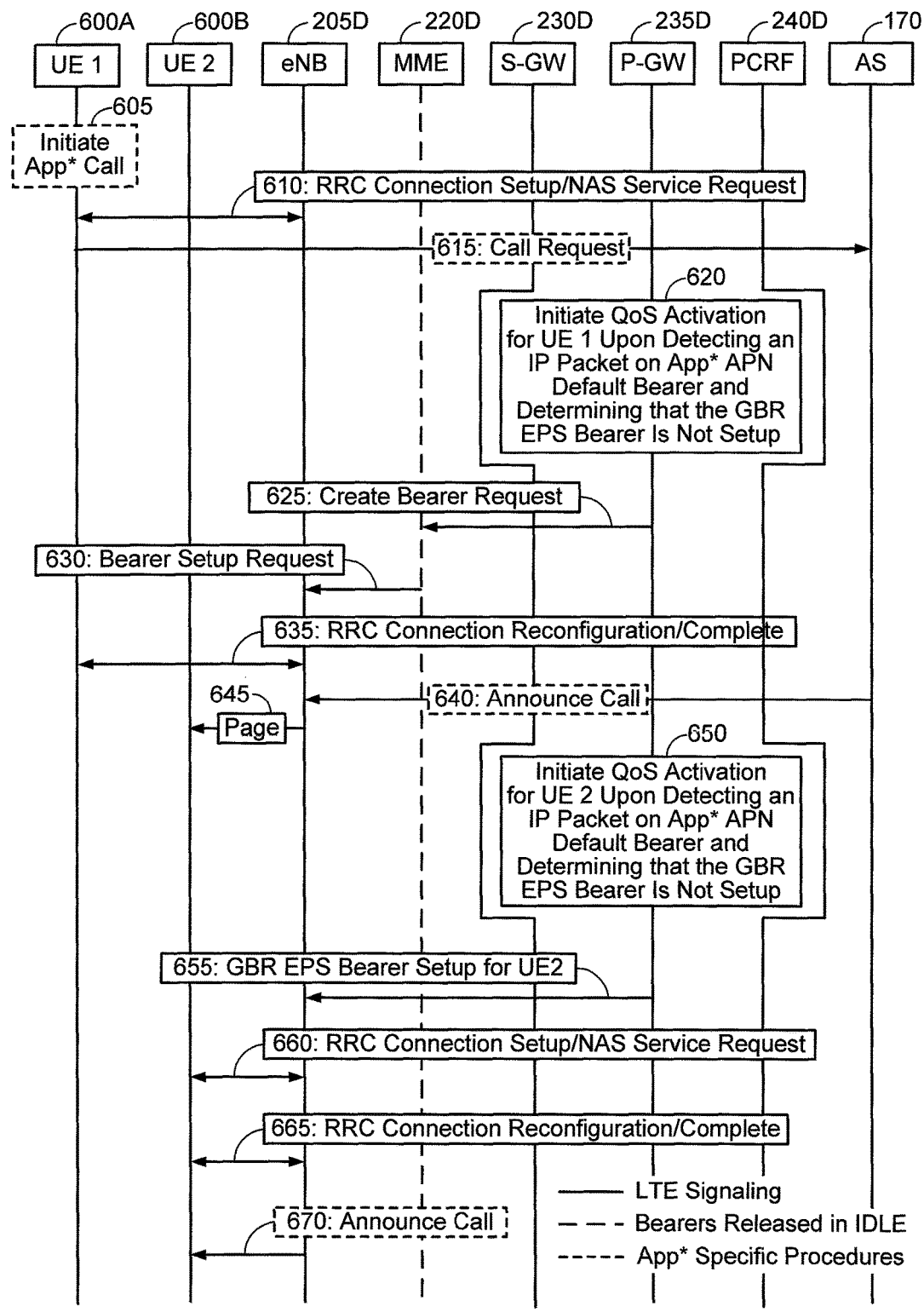
FIG. 6 illustrates an exemplary flow of a QoS allocation initiated by a P-GW, according to an embodiment.

FIG. 6 illustrates an exemplary flow of a QoS allocation initiated by a P-GW, such as P-GW 235D. The QoS allocation is based on the P-GW 235D detecting App* traffic on the App* APN default bearer. Initially, there are no active App* GBR EPS bearers. Rather, the only active bearers are the App*'s default non-GBR bearers.

At 605, UE 1 600A initiates an App* call to UE 2 600B. At 610, UE 1 600A and an eNB, such as eNB 205D, exchange RRC connection setup and NAS service request messages. At 615, UE 1 600A sends a call request message to the application server 170.

At 620, in response to detecting an IP packet on the App* APN default bearer and determining that the GBR EPS bearer for the App* is not setup, the P-GW 235D initiates the activation of the QoS for UE 1 600A. Although FIG. 6 illustrates the P-GW 235D initiating the activation of the QoS based on the App* APN, the P-GW 235D may initiate the activation of the QoS based on an application-specific identifier received from UE 1 600A in the call request. The application-specific identifier may be one of or a combination of an APN, a QCI, a DSCP, or an IP address. Alternatively, or additionally, the IMSI and an IP address/port may identify a specific user-service combination. Note that not all users for a particular service may be premium users (i.e., users who are expected to get QoS). Thus, using the combination of these application-specific identifiers, the P-GW 235D can initiate QoS only for certain users of a particular service and not others. The P-GW 235D initiates the QoS activation for a session that should be immediately active. An immediately active call or session refers to a call or session that is currently being setup with a UE, such as UE 1 600A. The IP packet received at the P-GW 235D or application server 170 corresponds to this active call or session.

At 625, the P-GW 235D creates a bearer request and sends it to the MME 220D. The request indicates the EPS bearer QoS for UE 1 600A and UE 2 600B and includes the values (QCI—"$QCI_{App}$*" or "1," GBR UL/DL—"$X_{App}$*" kbps). At 630, the MME 220D sends the bearer setup request to the eNB 205D. The request indicates the dedicated EPS bearer QoS for UE 1 600A and UE 2 600B and also includes the values (QCI—"$QCI_{App}$*" or "1," GBR UL/DL—"$X_{App}$*" kbps).

At 635, UE 1 600A and the eNB 205D exchange RRC connection reconfiguration and RRC connection reconfiguration complete messages. At 640, the application server 170 sends the eNB 205D a call announce message. At 645, the eNB 205D pages UE 2 600B.

At 650, in response to detecting an IP packet on the App* APN default bearer and determining that the GBR EPS bearer for the App* is not setup, the P-GW 235D initiates the activation of the QoS for UE 2 600B. At 655, the P-GW 235D sets up the GBR EPS bearer for UE 2 600B. The message includes the values (QCI—"$QCI_{App}$*" or "1," GBR UL/DL—"$X_{App}$*" kbps).

At 660, the eNB 205D and UE 2 600B exchange RRC connection setup and NAS service request messages. At 665, the eNB 205D and UE 2 600B exchange RRC connection reconfiguration and RRC connection reconfiguration complete messages. At 670, the eNB 205D sends a call announcement message to UE 2 600B.

A benefit of the flow illustrated in FIG. 6 is that there is no deep packet inspection required by the P-GW 235D. However, this causes the GBR EPS bearers to be setup even when traffic for a call that does not require QoS is detected on the default bearer for the App* APN. As such, in the case of a PTT application, the GBR EPS bearer would be setup for alerts or text messaging as well, since the P-GW 235D cannot distinguish whether the traffic is for an alert or a call. However, the present disclosure extends to non-PTT applications as well. Specifically, the various aspects of the disclosure apply to any application that may require GBR QoS for the media (e.g., audio, video, etc.), such as conversational voice, conversational video (e.g. live streaming), real time gaming, non-conversational voice (e.g. buffered streaming), IMS signaling, TCP-based video (e.g., buffered streaming), interactive gaming, and the like. For these applications, it may not be that critical to setup a GBR bearer immediately at the start of session setup. However, they may benefit from having the GBR bearer setup optimistically as well, as disclosed herein.

Figure 7:
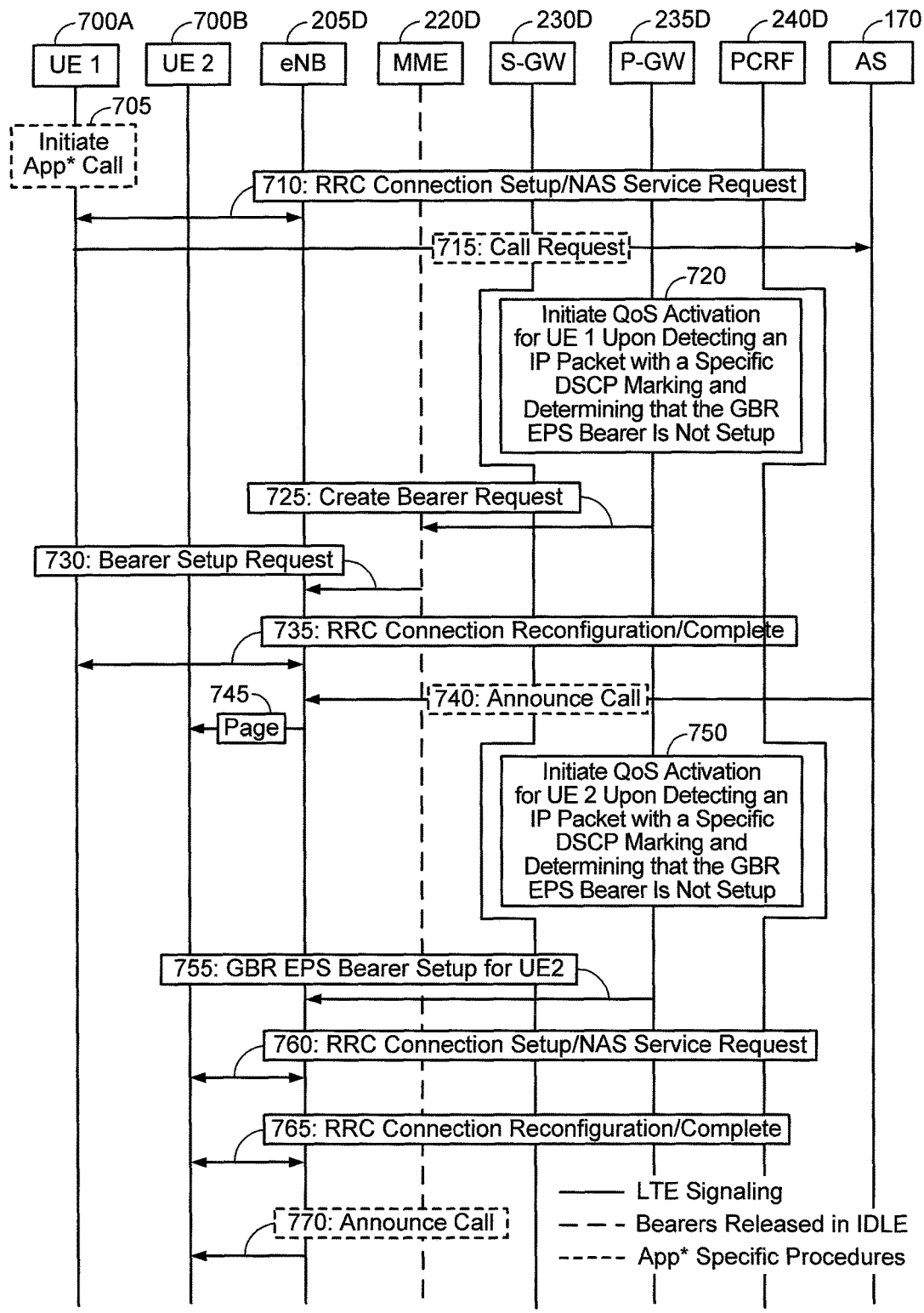
FIG. 7 illustrates an exemplary flow of a QoS allocation initiated by a P-GW, according to an embodiment.

FIG. 7 illustrates an exemplary flow of a QoS allocation initiated by a P-GW, such as P-GW 235D. The QoS allocation is based on the DSCP marking of the App* signaling. Initially, there are no active App* GBR EPS bearers. Rather, the only active bearers are the App*'s default non-GBR bearers.

At 705, UE 1 700A initiates an App* call to UE 2 700B. At 710, UE 1 700A and an eNB, such as eNB 205D, exchange RRC connection setup and NAS service request messages. At 715, UE 1 700A sends a call request message to the application server 170.

At 720, in response to detecting an IP packet on the App* APN default bearer with a specific DSCP marking and determining that the GBR EPS bearer for the App* is not setup, the P-GW 235D initiates the activation of the QoS for UE 1 700A. Specifically, the P-GW 235D determines whether the DSCP marking indicates a call or a text message, such as an alert. The DSCP marking can be any appropriate marking that can distinguish a call packet from a text message packet.

Although FIG. 7 illustrates the P-GW 235D initiating the activation of the QoS based on the DSCP marking, the P-GW 235D may optimistically initiate the QoS setup based on an application-specific identifier received from UE 1 700A in the call request. The application-specific identifier may be one or a combination of an APN, a QCI, a DSCP, or an IP address. Alternatively, or additionally, the IMSI and an IP address/port may identify a specific user-service combination. Note that not all users for a particular service may be premium users (e.g., users who are expected to get QoS). Thus, using the combination of these application-specific identifiers, the P-GW 235D can initiate QoS only for certain users of a particular service and not others. The P-GW 235D initiates the QoS activation for a session that should be immediately active.

At 725, the P-GW 235D creates a bearer request and sends it to the MME 220D. The request indicates the EPS bearer QoS for UE 1 700A and UE 2 700B and includes the values (QCI—"$QCI_{App}$*" or "1," GBR UL/DL—"$X_{App}$*" kbps). At 730, the MME 220D sends the bearer setup request to the eNB 205D. The request indicates the dedicated EPS bearer QoS for UE 1 700A and UE 2 700B and also includes the values (QCI—"QCI$_{App}$*" or "1," GBR UL/DL—"X$_{App}$*" kbps).

At 735, UE 1 700A and the eNB 205D exchange RRC connection reconfiguration and RRC connection reconfiguration complete messages. At 740, the application server 170 sends the eNB 205D a call announce message. At 745, the eNB 205D pages UE 2 700B.

At 750, in response to detecting an IP packet on the App* APN default bearer with a specific DSCP marking and determining that the GBR EPS bearer for the App* is not setup, the P-GW 235D initiates the activation of the QoS for UE 2 700B. At 755, the P-GW 235D sets up the GBR EPS bearer for UE 2 700B. The message includes the values (QCI—"QCI$_{App}$*" or "1," GBR UL/DL—"X$_{App}$*" kbps).

At 760, the eNB 205D and UE 2 700B exchange RRC connection setup and NAS service request messages. At 765, the eNB 205D and UE 2 700B exchange RRC connection reconfiguration and RRC Connection Reconfiguration complete messages. At 770, the eNB 205D sends a call announcement message to UE 2 700B.

Although the above disclosure refers to optimistically setting up a GBR bearer, the various aspects of the disclosure are applicable to non-GBR bearer activation as well, as will be discussed now with reference to FIGS. 8 and 9. Similarly, although the above disclosure refers to setting up a call, the various aspects of the disclosure are applicable to setting up any type of session that would benefit from QoS, as will also be discussed with reference to FIGS. 8 and 9.

Figure 8:
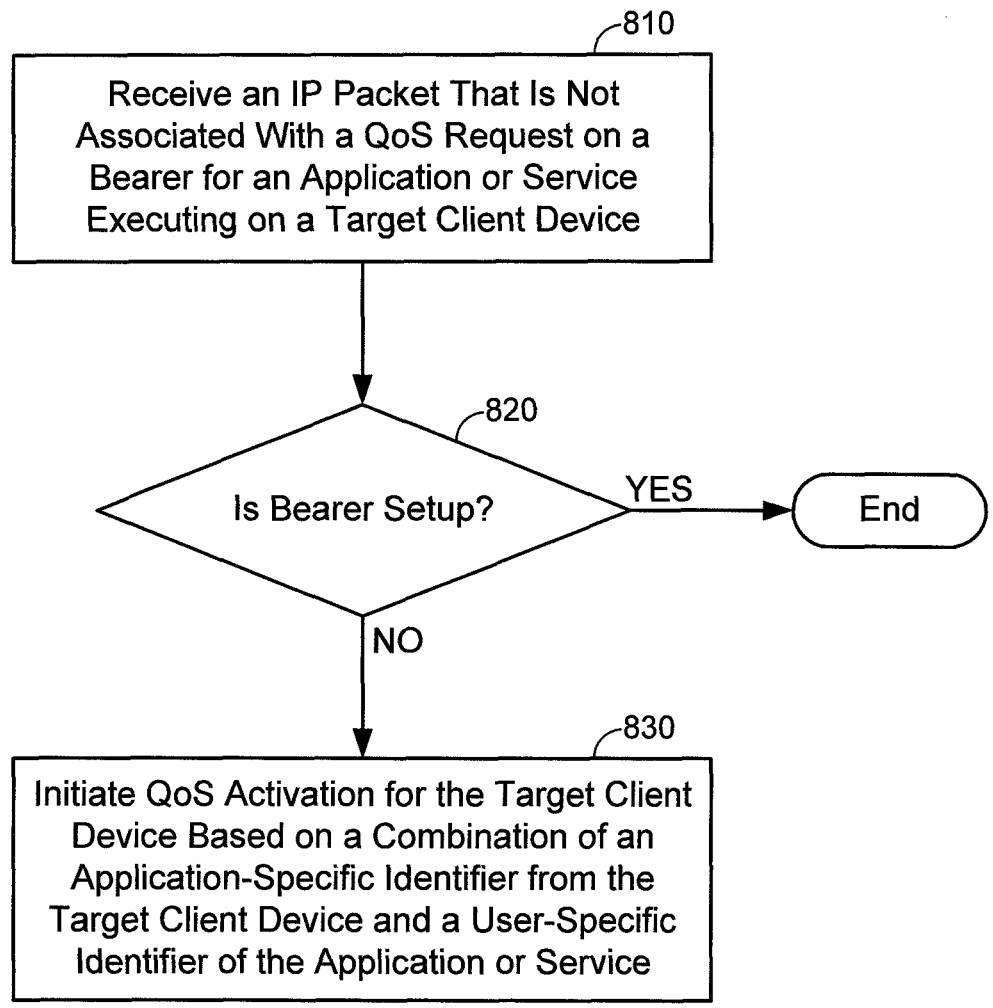
FIG. 8 illustrates an exemplary flow for optimistic QoS setup performed by a network element.

FIG. 8 illustrates an exemplary flow for optimistic QoS setup performed by a network element, such as P-GW 235D. At 810, the network element receives an IP packet that is not associated with a QoS request on a bearer for an application or service executing on a target client device. The bearer on which the IP packet is received may be a GBR bearer. Alternatively, the bearer on which the IP packet is received may be a non-GBR bearer.

At 820, the network element determines whether or not a QoS bearer is setup for a type of session that requires QoS. If it is, as in the case of a late joining client device, then the flow ends. If it is not, then the flow proceeds to 830.

At 830, the network element can initiate QoS activation for the target client device based on a combination of an application-specific identifier from the target client device and a user-specific identifier of the application or service. The application-specific identifier and the user-specific identifier may indicate that the application or session would benefit from QoS. The application-specific identifier may be one or more of an Access Point Name (APN), a QoS Class Identifier (QCI), a Differentiated Services Code Point (DSCP), or an IP address. An International Mobile Subscriber Identity (IMSI) and an IP address/port may identify a specific user of the application or service.

The initiating in 830 may include initiating the QoS activation for an immediate active session on the target client device. The initiating in 830 may include transmitting a request to setup the QoS for the target client device to a corresponding packet core network entity over a proprietary or standard interface.

A radio access network (RAN) serving the target client device attempting to establish the call may allocate the QoS.

Figure 9:
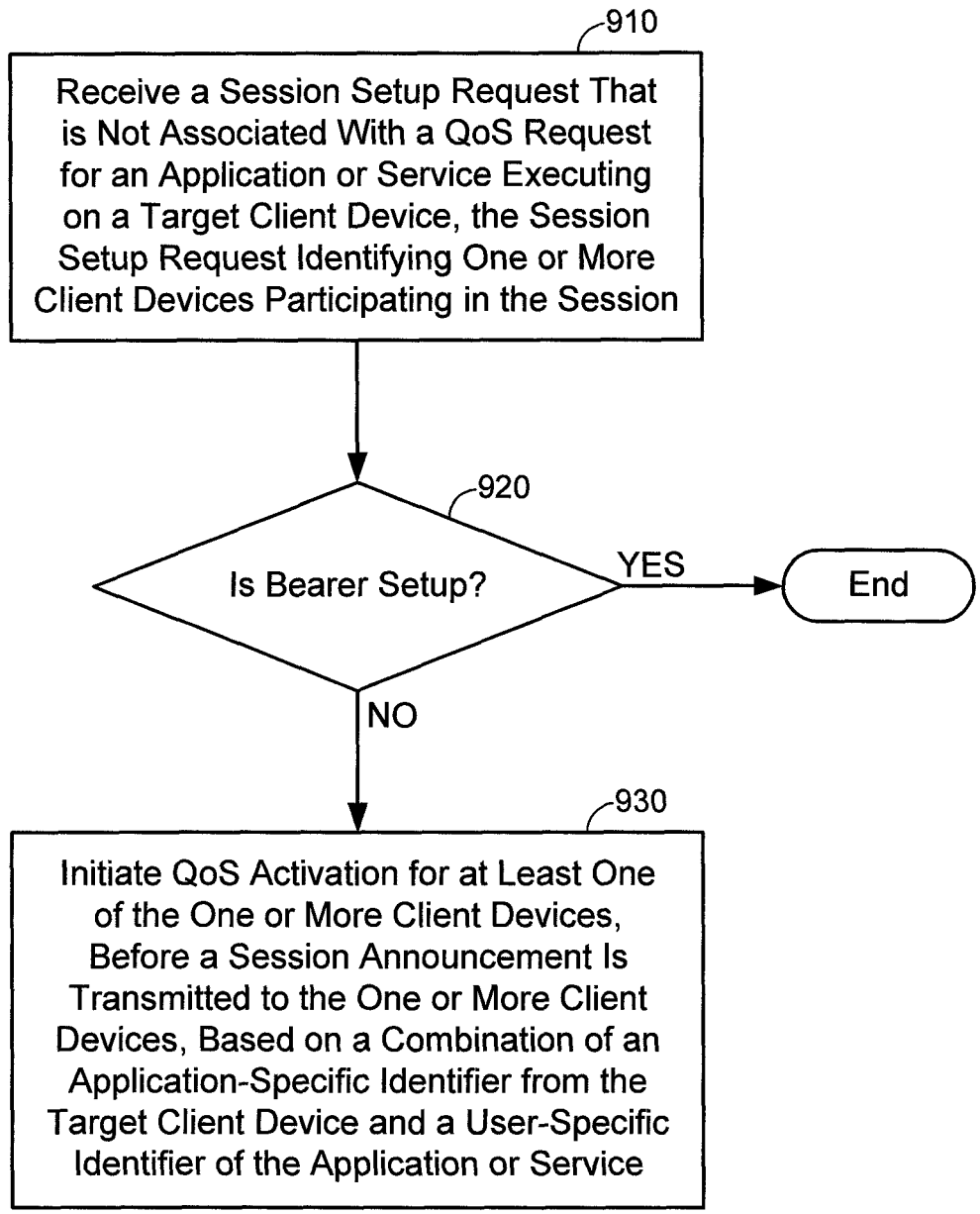
FIG. 9 illustrates an exemplary flow for optimistic QoS setup performed by an application server.

FIG. 9 illustrates an exemplary flow for optimistic QoS setup performed by an application server, such as application server 170. At 910, the application server receives a session setup request that is not associated with a QoS request for an application or service executing on a target client device, the session setup request identifying one or more client devices to participate in a session. The session setup request may be received from the target client device, and the target client device may be attempting to establish the session with the one or more client devices. A bearer on which the session setup request is received may be a GBR bearer. Alternatively, a bearer on which the session setup request is received may be a non-GBR bearer.

At 920, the application server determines whether or not a QoS bearer is setup for a type of session that requires QoS. If it is, as in the case of a late joining client device, then the flow ends. If it is not, then the flow proceeds to 930.

At 930, the application server initiates QoS activation for at least one of the one or more client devices, before a session announcement is transmitted to the one or more client devices, based on a combination of an application-specific identifier from the target client device and a user-specific identifier of the application or service. The application-specific identifier and the user-specific identifier may indicate that the application or session would benefit from QoS. The application-specific identifier may be one or more of an Access Point Name (APN), a QoS Class Identifier (QCI), a Differentiated Services Code Point (DSCP), or an IP address. An International Mobile Subscriber Identity (IMSI) and an IP address/port may identify a specific user of the application or service.

The initiating in 930 may include transmitting a request to setup the QoS for the one or more client devices to a corresponding packet core network entity over a proprietary or standard interface. The initiating in 930 may include initiating the QoS activation for an immediate active session on the target client device.

A radio access network (RAN) serving the target client device attempting to establish the session allocates the QoS. A bearer may be established for the target client device attempting to establish the session.

Accordingly, as illustrated in the various figures, the application server can determine whether QoS is to be activated for the one or more client devices participating in a call and activate QoS optimistically for each one of them. In contrast, the network element, such as the P-GW 235D, can determine whether QoS is required only for the device from which IP packet is received and not others.

Figure 10:
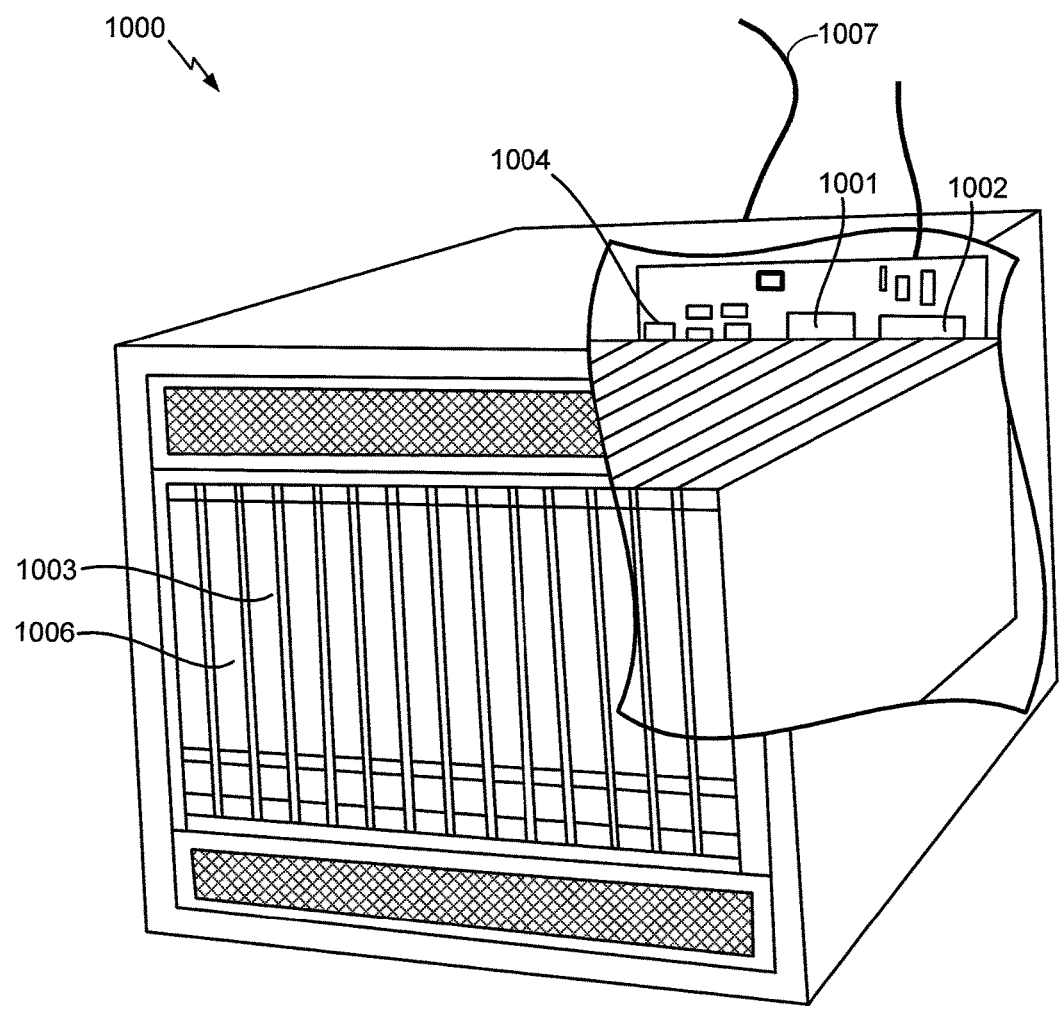
FIG. 10 illustrates an exemplary server according to various aspects of the disclosure.

Various aspects of the disclosure may be implemented on any of a variety of commercially available server devices, such as server 1000 illustrated in FIG. 10. In an example, the server 1000 may correspond to one example configuration of the application server 170 described above. In FIG. 10, the server 1000 includes a processor 1001 coupled to volatile memory 1002 and a large capacity nonvolatile memory, such as a disk drive 1003. The server 1000 may also include a floppy disc drive, compact disc (CD) or DVD disc drive 1006 coupled to the processor 1001. The server 1000 may also include network access ports 1004 coupled to the processor 1001 for establishing data connections with a network 1007, such as a local area network coupled to other broadcast system computers and servers or to the Internet. In context with FIG. 4, it will be appreciated that the server 1000 of FIG. 10 illustrates one example implementation of the communication device 400, whereby the logic configured to transmit and/or receive information 405 corresponds to the network access points 1004 used by the server 1000 to communicate with the network 1007, the logic configured to process information 410 corresponds to the processor 1001, and the logic configuration to store information 415 corresponds to any combination of the volatile memory 1002, the disk drive 1003 and/or the disc drive 1006. The optional logic configured to present information 420 and the optional logic configured to receive local user input 425 are not shown explicitly in FIG. 10 and may or may not be included therein. Thus, FIG. 10 helps to demonstrate that the communication device 400 may be implemented as a server, in addition to a UE implementation as in 305A or 305B as in FIG. 3.

While the embodiments above have been described primarily with reference to 1x EV-DO architecture in CDMA2000 networks, GPRS architecture in W-CDMA or UMTS networks and/or EPS architecture in LTE-based networks, it will be appreciated that other embodiments can be directed to other types of network architectures and/or protocols.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for optimistic quality of service (QoS) setup, comprising:

receiving, at a gateway within a core network serving a caller client device, an Internet protocol (IP) packet that is not associated with a QoS request on a bearer for an application or service executing on the caller client device;

in response to receiving the IP packet, initiating, by the gateway, QoS activation for the caller client device, before a session announcement is transmitted to one or more base stations serving one or more callee client devices, based on a combination of an application-specific identifier from the caller client device and a user-specific identifier of the application or service that identifies a specific user of the application or service, wherein initiating the QoS activation comprises transmitting, to a corresponding packet core network entity, a request to setup the QoS for the caller client device, and wherein the session announcement is subsequently transmitted to the one or more base stations serving the one or more callee client devices; and initiating, by the gateway, QoS activation for the one or more callee client devices after the session announcement is transmitted to the one or more base stations serving the one or more callee client devices and before the session announcement is transmitted to the one or more callee client devices, wherein initiating the QoS activation comprises transmitting, to the one or more base stations serving the one or more callee client devices, a request to setup the QoS for the one or more callee client devices.

2. The method of claim 1, wherein the bearer on which the IP packet is received comprises a guaranteed bit rate (GBR) bearer.

3. The method of claim 1, wherein the bearer on which the IP packet is received comprises a non-GBR bearer.

4. The method of claim 1, wherein the application-specific identifier and the user-specific identifier indicates that the application or service would benefit from QoS, wherein the IP packet is a call initiation packet received at an application server to initiate a call between the caller client device and the one or more callee client devices, and wherein the application server initiates the QoS setup for the caller client device and the one or more callee client devices prior to a QoS request from any of the caller client device and the one or more callee client devices.

5. The method of claim 4, wherein the application-specific identifier comprises one or more of an Access Point Name (APN), a QoS Class Identifier (QCI), a Differentiated Services Code Point (DSCP), or an IP address.

6. The method of claim 5, wherein an International Mobile Subscriber Identity (IMSI) and an IP address/port identify the specific user of the application or service.

7. The method of claim 4, further comprising:
determining that a QoS bearer is not setup for a type of session that requires QoS.

8. The method of claim 7, further comprising:
in response to the determining, establishing a QoS bearer for the caller client device.

9. The method of claim 1, wherein the initiating comprises:
initiating the QoS activation for an immediate active session on the caller client device.

10. The method of claim 1, wherein the request to setup the QoS for the caller client device is transmitted to the corresponding packet core network entity over a proprietary or standard interface.

11. The method of claim 1, wherein a radio access network (RAN) serving the caller client device allocates the QoS.

12. A method for optimistic quality of service (QoS) setup, comprising:
receiving, at an application server, a session setup request that is not associated with a QoS request for an application or service executing on a caller client device and one or more callee client devices, the session setup request received on a default radio bearer for the application or service and identifying the one or more callee client devices to participate in a session;
in response to receiving the session setup request, initiating, by the application server, QoS activation for at least one of the one or more callee client devices, before a session announcement is transmitted to one or more base stations that are separate from the application server and are serving the one or more callee client devices, based on a combination of an application-specific identifier from the caller client device and a user-specific identifier of the application or service that identifies a specific user of the application or service, wherein initiating the QoS activation includes initiating setup of a dedicated radio bearer for the application or service;
sending, by the application server, a call acceptance message to the one or more base stations after QoS activation has been initiated for the at least one of the one or more callee client devices and before the session announcement is transmitted to the one or more base stations; and
transmitting, by the application server, the session announcement to the one or more base stations.

13. The method of claim 12, wherein the session setup request is received from the caller client device, and wherein the caller client device is attempting to establish the session with the one or more callee client devices.

14. The method of claim 13, wherein a radio access network (RAN) serving the caller client device attempting to establish the session allocates the QoS.

15. The method of claim 13, wherein a bearer is established for the caller client device attempting to establish the session.

16. The method of claim 12, wherein the initiating the QoS activation comprises transmitting a request to setup the QoS for the one or more callee client devices to a corresponding packet core network entity over a proprietary or standard interface.

17. The method of claim 12, further comprising:
determining that a QoS bearer is not setup for a type of session that requires QoS.

18. The method of claim 17, further comprising:
in response to the determining, initiating establishment of a QoS bearer for the caller client device.

19. The method of claim 12, wherein a bearer on which the session setup request is received comprises a guaranteed bit rate (GBR) bearer.

20. The method of claim 12, wherein a bearer on which the session setup request is received comprises a non-GBR bearer.

21. The method of claim 12, wherein the application-specific identifier and the user-specific identifier indicates that the application or service would benefit from QoS.

22. The method of claim 21, wherein the application-specific identifier comprises one or more of an Access Point Name (APN), a QoS Class Identifier (QCI), a Differentiated Services Code Point (DSCP), or an IP address.

23. The method of claim 22, wherein an International Mobile Subscriber Identity (IMSI) and an IP address/port identify the specific user of the application or service.

24. The method of claim 12, wherein the initiating comprises:
initiating the QoS activation for an immediate active session on the caller client device.

25. An apparatus for optimistic quality of service (QoS) setup, comprising:
at least one processor of a gateway within a core network serving a caller client device; and
a communication interface of the gateway coupled to the at least one processor and configured to:
receive an Internet protocol (IP) packet that is not associated with a QoS request on a bearer for an application or service executing on the caller client device;
initiate QoS activation for the caller client device, before a session announcement is transmitted to one or more base stations serving one or more callee client devices, based on a combination of an application-specific identifier from the caller client device and a user-specific identifier of the application or service that identifies a specific user of the application or service in response to reception of the IP packet, wherein initiation of the QoS activation comprises transmission, to a corresponding packet core network entity, of a request to setup the QoS for the caller client device, and wherein the session announcement is subsequently transmitted to the one or more base stations serving the one or more callee client devices; and initiate QoS activation for the one or more callee client devices after the session announcement is transmitted to the one or more base stations serving the one or more callee client devices and before the session announcement is transmitted to the one or more callee client devices, wherein initiation of the QoS activation comprises transmission, to the one or more base stations serving the one or more callee client devices, of a request to setup the QoS for the one or more callee client devices.

26. The apparatus of claim 25, wherein the bearer on which the IP packet is received comprises a guaranteed bit rate (GBR) bearer.

27. The apparatus of claim 25, wherein the bearer on which the IP packet is received comprises a non-GBR bearer.

28. The apparatus of claim 25, wherein the application-specific identifier and the user-specific identifier indicates that the application or service would benefit from QoS, wherein the IP packet is a call initiation packet received at an application server to initiate a call between the caller client device and the one or more callee client devices, and wherein the application server initiates the QoS setup for the caller client device and the one or more callee client devices prior to a QoS request from any of the caller client device and the one or more callee client devices.

29. The apparatus of claim 28, wherein the application-specific identifier comprises one or more of an Access Point Name (APN), a QoS Class Identifier (QCI), a Differentiated Services Code Point (DSCP), or an IP address.

30. The apparatus of claim 29, wherein an International Mobile Subscriber Identity (IMSI) and an IP address/port identify the specific user of the application or service.

31. The apparatus of claim 28, wherein the at least one processor is configured to:
    determine that a QoS bearer is not setup for a type of session that requires QoS.

32. The apparatus of claim 31, wherein the at least one processor is further configured to:
    establish, in response to the determination that a QoS bearer is not setup, a QoS bearer for the caller client device.

33. The apparatus of claim 25, wherein the communication interface being configured to initiate comprises the communication interface being configured to:
    initiate the QoS activation for an immediate active session on the caller client device.

34. The apparatus of claim 25, wherein the communication interface being configured to initiate the QoS activation comprises the communication interface being configured to:
    transmit a request to setup the QoS for the caller client device to a corresponding packet core network entity over a proprietary or standard interface.

35. The apparatus of claim 25, wherein a radio access network (RAN) serving the caller client device allocates the QoS.

36. An apparatus for optimistic quality of service (QoS) setup, comprising:
    at least one processor of an application server; and
    a communication interface of the application server coupled to the at least one processor and configured to:
        receive a session setup request that is not associated with a QoS request for an application or service executing on a caller client device and one or more callee client devices, the session setup request received on a default radio bearer for the application or service and identifying the one or more callee client devices to participate in a session;
        initiate, in response to reception of the session setup request, QoS activation for at least one of the one or more callee client devices, before a session announcement is transmitted to one or more base stations that are separate from the application server and are serving the one or more callee client devices, based on a combination of an application-specific identifier from the caller client device and a user-specific identifier of the application or service that identifies a specific user of the application or service, wherein initiation of the QoS activation includes initiation of setup of a dedicated radio bearer for the application or service;
        send a call acceptance message to the one or more base stations after QoS activation has been initiated for the at least one of the one or more callee client devices and before the session announcement is transmitted to the one or more base stations; and
        transmit the session announcement to the one or more base stations.

37. The apparatus of claim 36, wherein the session setup request is received from the caller client device, and wherein the caller client device is attempting to establish the session with the one or more callee client devices.

38. The apparatus of claim 37, wherein a radio access network (RAN) serving the caller client device attempting to establish the session allocates the QoS.

39. The apparatus of claim 37, wherein a bearer is established for the caller client device attempting to establish the session.

40. The apparatus of claim 36, wherein the communication interface being configured to initiate the QoS activation comprises the communication interface being configured to:
    transmit a request to setup the QoS for the one or more callee client devices to a corresponding packet core network entity over a proprietary or standard interface.

41. The apparatus of claim 36, wherein the at least one processor is configured to:
    determine that a QoS bearer is not setup for a type of session that requires QoS.

42. The apparatus of claim 41, wherein the communication interface is further configured to:
    initiate, in response to the determination, establishment of a QoS bearer for the caller client device.

43. The apparatus of claim 36, wherein a bearer on which the session setup request is received comprises a guaranteed bit rate (GBR) bearer.

44. The apparatus of claim 36, wherein a bearer on which the session setup request is received comprises a non-GBR bearer.

45. The apparatus of claim 36, wherein the application-specific identifier and the user-specific identifier indicates that the application or service would benefit from QoS.

46. The apparatus of claim 45, wherein the application-specific identifier comprises one or more of an Access Point Name (APN), a QoS Class Identifier (QCI), a Differentiated Services Code Point (DSCP), or an IP address.

47. The apparatus of claim 46, wherein an International Mobile Subscriber Identity (IMSI) and an IP address/port identify the specific user of the application or service.

48. The apparatus of claim 36, wherein the communication interface being configured to initiate comprises the communication interface being configured to:
   initiate the QoS activation for an immediate active session on the caller client device.

49. An apparatus for optimistic quality of service (QoS) setup, comprising:
   means for receiving, of a gateway within a core network serving a caller client device, an Internet protocol (IP) packet that is not associated with a QoS request on a bearer for an application or service executing on the caller client device;
   means for initiating, of the gateway, in response to reception of the IP packet, QoS activation for the caller client device, before a session announcement is transmitted to one or more base stations serving one or more callee client devices, based on a combination of an application-specific identifier from the caller client device and a user-specific identifier of the application or service that identifies a specific user of the application or service, wherein initiation of the QoS activation comprises transmission, to a corresponding packet core network entity, of a request to setup the QoS for the caller client device, and wherein the session announcement is subsequently transmitted to the one or more base stations serving the one or more callee client devices; and
   means for initiating, of the gateway, QoS activation for the one or more callee client devices after the session announcement is transmitted to the one or more base stations serving the one or more callee client devices and before the session announcement is transmitted to the one or more callee client devices, wherein initiation of the QoS activation comprises transmission, to the one or more base stations serving the one or more callee client devices, of a request to setup the QoS for the one or more callee client devices.

50. An apparatus for optimistic quality of service (QoS) setup, comprising:
   means for receiving, of an application server, a session setup request that is not associated with a QoS request for an application or service executing on a caller client device and one or more callee client devices, the session setup request received on a default radio bearer for the application or service and identifying the one or more callee client devices to participate in a session;
   means for initiating, of the application server, in response to reception of the session setup request, QoS activation for at least one of the one or more callee client devices, before a session announcement is transmitted to one or more base stations that are separate from the application server and are serving the one or more callee client devices, based on a combination of an application-specific identifier from the caller client device and a user-specific identifier of the application or service that identifies a specific user of the application or service, wherein initiation of the QoS activation includes initiation of setup of a dedicated radio bearer for the application or service;
   means for sending, of the application server, a call acceptance message to the one or more base stations after QoS activation has been initiated for the at least one of the one or more callee client devices and before the session announcement is transmitted to the one or more base stations; and
   means for transmitting, of the application server, the session announcement to the one or more base stations.

51. A non-transitory computer-readable medium for optimistic quality of service (QoS) setup, comprising:
   at least one instruction instructing a gateway within a core network serving a caller client device to receive an Internet protocol (IP) packet that is not associated with a QoS request on a bearer for an application or service executing on the caller client device;
   at least one instruction instructing the gateway to initiate QoS activation for the caller client device, before a session announcement is transmitted to one or more base stations serving one or more callee client devices, based on a combination of an application-specific identifier from the caller client device and a user-specific identifier of the application or service that identifies a specific user of the application or service in response to reception of the IP packet, wherein initiation of the QoS activation comprises transmission, to a corresponding packet core network entity, of a request to setup the QoS for the caller client device, and wherein the session announcement is subsequently transmitted to the one or more base stations serving the one or more callee client devices; and
   at least one instruction instructing the gateway to initiate QoS activation for the one or more callee client devices after the session announcement is transmitted to the one or more base stations serving the one or more callee client devices and before the session announcement is transmitted to the one or more callee client devices, wherein initiation of the QoS activation comprises transmission, to the one or more base stations serving the one or more callee client devices, of a request to setup the QoS for the one or more callee client devices.

52. A non-transitory computer-readable medium for optimistic quality of service (QoS) setup, comprising:
   at least one instruction instructing an application server to receive a session setup request that is not associated with a QoS request for an application or service executing on a caller client device and one or more callee client devices, the session setup request received on a default radio bearer for the application or service and identifying the one or more callee client devices to participate in a session;
   at least one instruction instructing the application server to initiate, in response to reception of the session setup request, QoS activation for at least one of the one or more callee client devices, before a session announcement is transmitted to one or more base stations that are separate from the application server and are serving the one or more callee client devices, based on a combination of an application-specific identifier from the caller client device and a user-specific identifier of the application or service that identifies a specific user of the application or service, wherein initiation of the QoS activation includes initiation of setup of a dedicated radio bearer for the application or service;
   at least one instruction instructing the application server to send a call acceptance message to the one or more base stations after QoS activation has been initiated for the at least one of the one or more callee client devices and before the session announcement is transmitted to the one or more base stations; and at least one instruction instructing the application server to transmit the session announcement to the one or more base stations.

53. The method of claim 1, wherein the QoS activation is initiated based on detecting an IP packet on a default bearer for the application or service and determining that a QoS bearer is not setup for the application or service.

* * * * *